UNITED STATES PATENT OFFICE.

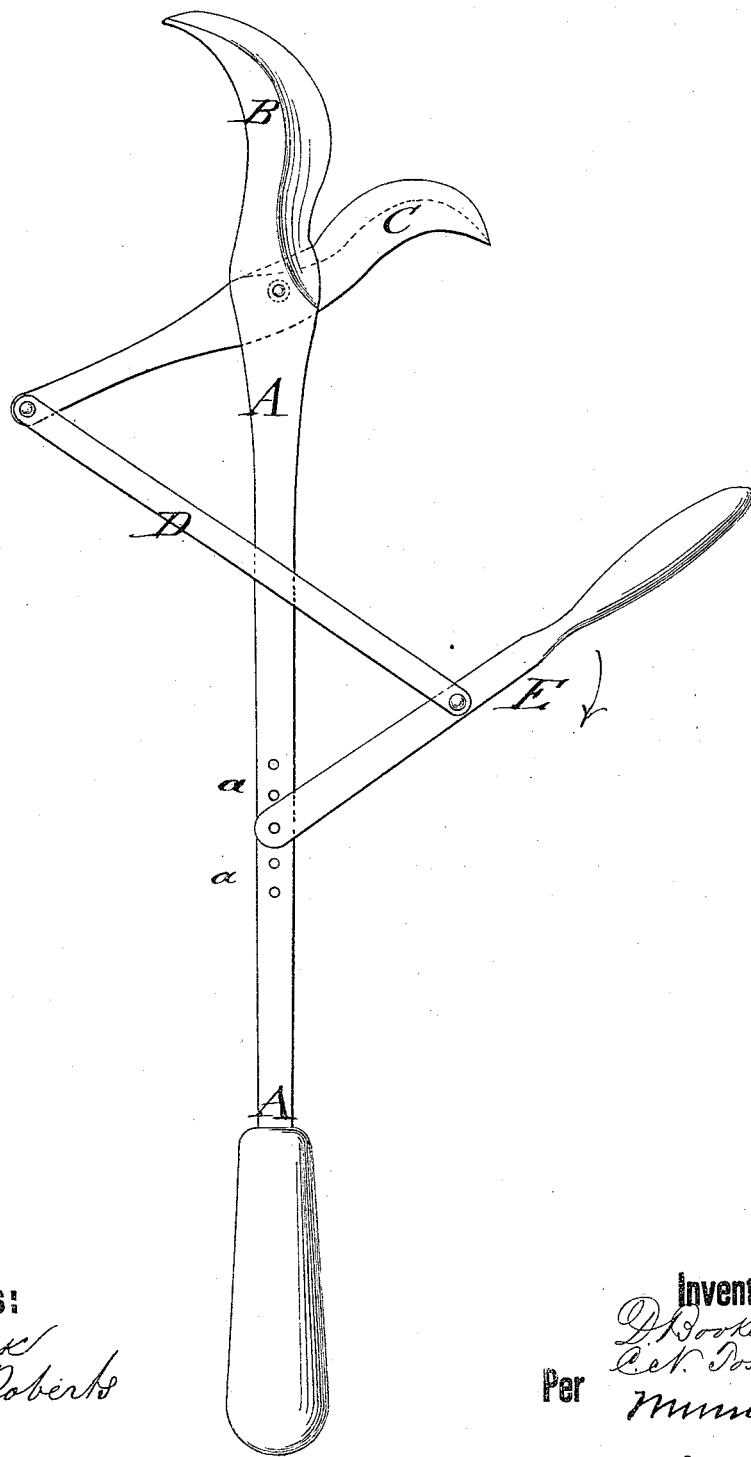

DAVID BOOKER AND CORNELIUS N. TOSH, OF PALMYRA, ILLINOIS.

IMPROVEMENT IN HOOF-TRIMMERS.

Specification forming part of Letters Patent No. 148,659, dated March 17, 1874; application filed January 24, 1874.

*To all whom it may concern:*

Be it known that we, DAVID BOOKER and CORNELIUS N. TOSH, of Palmyra, in the county of Macoupin and State of Illinois, have invented a New and Improved Hoof-Trimmer, of which the following is a specification:

The accompanying drawing represents a side elevation of our improved hoof-trimmer.

The object of our invention is to provide, for the use of blacksmiths and farriers, an improved hoof-trimmer, by which the horse's hoof may be neatly pared on the flat part, cleaned from the dirt, and trimmed at the outer edge, so that the hoof is quickly and fully fitted to the shoe.

Our invention consists of a main cutting knife or blade at the end of a strong bar or rod, with handle end, which knife is curved outwardly to a point, and serves with its end for paring and cleaning the hoof, while the lower part is used, in connection with a second smaller curved knife, which is pivoted to the larger and operated by pivoted connecting-rods and hand-lever, like shears, for trimming the hoof.

A, in the drawing, represents the main bar of the hoof-trimming implement, which is provided at its lower end with a handle, and in its forward end with a strong outwardly-curved knife, B. The broader part of the knife B narrows down toward a point at the end, as indicated in the drawing, and is sharpened, for the purpose of paring and cutting the hoof, along its lower side, the point end serving to clean out the dirt and other impurities. A shorter curved knife, C, with sharp edge, is pivoted to knife B, and with its backward-extending arm to a connecting single or double rod, D, which passes along or at both sides of main bar A, and is pivoted again at its end to a hand-lever, E. Hand-lever E is also pivoted with one end to main piece A, being adjustable thereon by pivot pin and holes $a$, by which a greater or less degree of play of the knives B and C is produced.

The knives act on the carrying hand lever E, toward the main-bar A, like shears, for trimming off the edge of the hoof, and fitting the same neatly and completely to the shoe.

Having thus described our invention, we claim as new and desire to secure by Letters Patent—

The hoof trimming and paring implement herein described, consisting of the curved blade B, having a pointed end, the handle or stock A, pivoted blade C, connecting-link D, and adjustable hand lever E, when the various parts are constructed and relatively arranged to operate in the manner set forth.

DAVID BOOKER.
CORNELIUS N. TOSH.

Witnesses:
JOHN F. CHILES,
J. D. SHOME.